United States Patent
Razak et al.

(10) Patent No.: US 11,175,195 B2
(45) Date of Patent: Nov. 16, 2021

(54) APPARATUS AND A METHOD OF MEASURING THE THRUST OF A GEARED GAS TURBINE ENGINE

(71) Applicant: ROLLS-ROYCE plc, London (GB)

(72) Inventors: Ahmed M Y Razak, Bristol (GB); Arthur L Rowe, Derby (GB)

(73) Assignee: ROLLS-ROYCE plc, London (GB)

( * ) Notice: Subject to any disclaimer, the term of this patent is extended or adjusted under 35 U.S.C. 154(b) by 344 days.

(21) Appl. No.: 16/540,173

(22) Filed: Aug. 14, 2019

(65) Prior Publication Data

US 2020/0088595 A1 Mar. 19, 2020

(30) Foreign Application Priority Data

Sep. 13, 2018 (GB) ...................... 1814895

(51) Int. Cl.
  *G01M 15/14* (2006.01)
  *G01L 5/13* (2006.01)
  *G01L 5/00* (2006.01)
  *F02C 7/36* (2006.01)
  *B64F 5/60* (2017.01)

(52) U.S. Cl.
  CPC ............... *G01L 5/133* (2013.01); *B64F 5/60* (2017.01); *F02C 7/36* (2013.01); *G01L 5/0095* (2013.01); *G01L 5/136* (2013.01)

(58) Field of Classification Search
  CPC .......... B64F 5/60; G01L 5/0095; G01L 5/133; G01M 15/14
  USPC ..................................................... 73/112.04
  See application file for complete search history.

(56) References Cited

U.S. PATENT DOCUMENTS

| | | |
|---|---|---|
| 2007/0220897 A1 | 9/2007 | Howlett et al. |
| 2018/0171816 A1 | 6/2018 | Moniz et al. |
| 2018/0363665 A1* | 12/2018 | Sheridan .................. F02C 7/06 |

FOREIGN PATENT DOCUMENTS

| | | |
|---|---|---|
| EP | 3147220 A1 | 3/2017 |
| EP | 3333082 A1 | 6/2018 |

OTHER PUBLICATIONS

Feb. 3, 2020 Search Report issued in European Patent Application No. 19192239.

* cited by examiner

*Primary Examiner* — Eric S. McCall
(74) *Attorney, Agent, or Firm* — Oliff PLC (57) ABSTRACT

An apparatus measuring thrust of an aircraft gas turbine engine includes a core shaft connecting a turbine and compressor, a fan and gearbox with a sun gear driven by the core shaft, a plurality of planet gears, an annulus gear mounted in a static structure, and a planet carrier driven by the fan via fan shaft. The apparatus includes a sensor to measure force applied by the annulus gear on the static structure and first and second sensors to measure rotational speed of the core and fan shafts. A processor determines restoring torque on the annulus gear from measurement of force applied by the gear on the static structure, torque applied to the fan by the planet carrier using rotational speeds of core and fan shafts and restoring torque on the annulus gear, and thrust of the fan from torque applied to the fan and the fan's rotational speed.

20 Claims, 4 Drawing Sheets

APPARATUS AND A METHOD OF MEASURING THE THRUST OF A GEARED GAS TURBINE ENGINE

CROSS-REFERENCE TO RELATED APPLICATIONS

This specification is based upon and claims the benefit of priority from UK Patent Application Number GB 1814895.7 filed on Sep. 13, 2018, the entire contents of which are incorporated herein by reference.

BACKGROUND

Field of the Disclosure

The present disclosure relates to an apparatus and a method of measuring the thrust of a geared gas turbine engine and in particular to an apparatus and a method of measuring the thrust of a geared gas turbine engine for an aircraft.

Description of the Related Art

It is not possible to measure the thrust of a gas turbine engine installed on an aircraft. Parameters of a gas turbine engine are commonly used to determine the thrust of the gas turbine engine. In the past engine pressure ratio (EPR) and turbofan power ratio (TPR) have been used for controlling, or setting, the thrust produced by low and high bypass ratio turbofan gas turbine engines respectively. As the bypass ratio of a gas turbine engine increases the nozzle pressure ratio decreases sufficiently so that a small error in the measurement of the engine pressure ratio (EPR) may give rise to an unacceptable error in the thrust setting of, or the thrust developed, by the gas turbine engine if the engine pressure ratio is used to control the thrust setting of the gas turbine engine. Turbofan power ratio (TPR) may be used to control the thrust setting of a high bypass ratio gas turbine engine provided parameters of the gas turbine engine associated with hot components are used, for example the inlet parameters of the low pressure turbine of the gas turbine engine. The engine thrust versus turbofan power ratio (TPR) relationship is largely independent of deterioration of the gas turbine engine. However, deterioration of the low pressure system and air system of the gas turbine engine affects the thrust versus turbofan power ratio (TPR) relationship resulting in inaccurate thrust setting of, or the thrust developed, by the gas turbine engine.

Accordingly the present disclosure seeks to provide a novel apparatus and method of measuring the thrust of a geared gas turbine engine which reduces or overcomes the above mentioned problem.

SUMMARY OF THE DISCLOSURE

According to a first aspect there is provided an apparatus for measuring the thrust of a gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the gearbox comprising a sun gear, a plurality of planet gears, an annulus gear and a planet carrier, the sun gear meshing with the planet gears and the planet gears meshing with the annulus gear, each planet gear being rotatably mounted on the planet carrier, the core shaft being arranged to drive the sun gear and one of the planet carrier and the annulus gear being arranged to drive the fan via a fan shaft,
the other one of the annulus gear and the planet carrier being mounted in a static structure, the static structure being arranged to restrain rotational movement of the other one of the annulus gear and the planet carrier,
the apparatus for measuring the thrust of a gas turbine engine for an aircraft comprising:
at least one force sensor to measure the force applied by the other one of the annulus gear and the planet carrier on the static structure,
a first rotational speed sensor arranged to measure the rotational speed of the core shaft,
a second rotational speed sensor arranged to measure the rotational speed of the fan shaft,
a processor arranged to receive the measurement of the force applied by the other one of the annulus gear and the planet carrier on the static structure, the processor being arranged to determine the restoring torque on the other one of the annulus gear and the planet carrier from the measurement of the force applied by the other one of the annulus gear and the planet carrier on the static structure, the processor arranged to receive the measurement of the rotational speed of the core shaft, the processor arranged to receive the measurement of the rotational speed of the fan shaft, the processor being arranged to determine the torque applied to the fan by the one of the planet carrier and the annulus gear using the rotational speed of the core shaft, the rotational speed of the fan shaft and the restoring torque on the other one of the annulus gear and the planet carrier,
the processor being arranged to determine the thrust of the fan from the torque applied to the fan and the rotational speed of the fan.

The planet carrier may be arranged to drive the fan via the fan shaft,
the annulus gear being mounted in the static structure, the static structure being arranged to restrain rotational movement of the annulus gear,
the at least one force sensor to measure the force applied by the annulus gear on the static structure,
the processor arranged to receive the measurement of the force applied by the annulus gear on the static structure, the processor being arranged to determine the restoring torque on the annulus gear from the measurement of the force applied by the annulus gear on the static structure, the processor being arranged to determine the torque applied to the fan by the planet carrier using the rotational speed of the core shaft, the rotational speed of the fan shaft and the restoring torque on the annulus gear.

The annulus gear may be arranged to drive the fan via the fan shaft,
the planet carrier being mounted in the static structure, the static structure being arranged to restrain rotational movement of the planet carrier,
the at least one force sensor to measure the force applied by the planet carrier on the static structure,
a processor arranged to receive the measurement of the force applied by the planet carrier on the static structure, the processor being arranged to determine the restoring torque on the planet carrier from the measurement of the force applied by the planet carrier on the static structure, the processor being arranged to determine the torque applied to the fan by the annulus gear using the rotational speed of the core shaft, the rotational speed of the fan shaft and the restoring torque on the planet carrier.

The turbine may be a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

The at least one force sensor may comprise a plurality of force sensors circumferentially arranged, angularly spaced, around the annulus gear.

The, or each, force sensor may comprise a fluid filled collapsible chamber mounted on the static structure, a member mounted on the annulus gear and arranged to bear upon the fluid filled collapsible chamber and a pressure sensor to measure the pressure of the fluid within the fluid filled collapsible chamber.

The member of the, or each, force sensor may extend axially from a first axial side of the annulus gear, the member having a face arranged parallel to a radial line passing through the annulus gear and the fluid filled collapsible chamber abutting the face of the member.

The member of the, or each, force sensor may extend axially from a first axial side of the annulus gear, the member being wedge shaped, the member having a first face arranged tangentially to a circle coaxial with the annulus gear, the member having a second face arranged perpendicularly to the first face and the fluid filled collapsible chamber abutting the second face of the member.

The at least one force sensor may comprise a plurality of force sensors circumferentially arranged, angularly spaced, around the planet carrier.

The, or each, force sensor may comprise a fluid filled collapsible chamber mounted on the static structure, a member mounted on the planet carrier and arranged to bear upon the fluid filled collapsible chamber and a pressure sensor to measure the pressure of the fluid within the fluid filled collapsible chamber.

The member of the, or each, force sensor may extend axially from a first axial side of the planet carrier, the member having a face arranged parallel to a radial line passing through the planet carrier and the fluid filled collapsible chamber abutting the face of the member.

The member of the, or each, force sensor may extend axially from a first axial side of the planet carrier, the member being wedge shaped, the member having a first face arranged tangentially to a circle coaxial with the planet carrier, the member having a second face arranged perpendicularly to the first face and the fluid filled collapsible chamber abutting the second face of the member.

The fluid filled collapsible chamber may comprise a bellows filled with oil.

The at least one force sensor may comprise a pressure pad, a strain gauge, a fibre optic cable or a compression force cell.

The first rotational speed sensor may comprise a variable-reluctance speed probe and a phonic wheel.

The second rotational speed sensor may comprise a variable-reluctance speed probe and a phonic wheel.

The processor may be arranged to control the thrust setting of the geared gas turbine engine from the thrust of the fan determined from the torque applied to the fan and the rotational speed of the fan.

In certain embodiments the sun gear may be static and the core shaft may drive one of the drives one of the planet carrier and the annulus gear and the one of the sun gear and the planet carrier drives the fan.

According to a second aspect there is provided a method of measuring the thrust of a gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the gearbox comprising a sun gear, a plurality of planet gears, an annulus gear and a planet carrier, the sun gear meshing with the planet gears and the planet gears meshing with the annulus gear, each planet gear being rotatably mounted on the planet carrier, the core shaft being arranged to drive the sun gear and one of the planet carrier and the annulus gear being arranged to drive the fan via a fan shaft,
the other one of the annulus gear and the planet carrier being mounted in a static structure, the static structure being arranged to restrain rotational movement of the other one of the annulus gear and the planet carrier,
the method comprising:
measuring the force applied by the other one of the annulus gear and the planet carrier on the static structure,
measuring the rotational speed of the core shaft,
measuring the rotational speed of the fan shaft,
determining the restoring torque on the other one of the annulus gear and the planet carrier from the measurement of the force applied by the other one of the annulus gear and the planet carrier on the static structure, determining the torque applied to the fan by the one of the planet carrier and the annulus gear using the rotational speed of the core shaft, the rotational speed of the fan shaft and the restoring torque on the other one of the annulus gear and the planet carrier,
and determining the thrust of the fan from the torque applied to the fan and the rotational speed of the fan.

The planet carrier may be arranged to drive the fan via the fan shaft,
the annulus gear being mounted in the static structure, the static structure being arranged to restrain rotational movement of the annulus gear,
the method comprising measuring the force applied by the annulus gear on the static structure,
determining the restoring torque on the annulus gear from the measurement of the force applied by the annulus gear on the static structure, determining the torque applied to the fan by the planet carrier using the rotational speed of the core shaft, the rotational speed of the fan shaft and the restoring torque on the annulus gear.

The annulus gear may be arranged to drive the fan via the fan shaft,
the planet carrier being mounted in the static structure, the static structure being arranged to restrain rotational movement of the planet carrier, the method comprising measuring the force applied by the planet carrier on the static structure, determining the restoring torque on the planet carrier from the measurement of the force applied by the planet carrier on the static structure, determining the torque applied to the fan by the annulus gear using the rotational speed of the core shaft, the rotational speed of the fan shaft and the restoring torque on the planet carrier.

The measuring of the force applied by the annulus gear on the static structure may comprise providing a plurality of force sensors circumferentially arranged, angularly spaced, around the annulus gear.

The measuring of the force applied by the annulus gear on the static structure may comprise providing a fluid filled collapsible chamber mounted on the static structure, providing a member mounted on the annulus gear and arranged to bear upon the fluid filled collapsible chamber and measuring the pressure of the fluid within the fluid filled collapsible chamber.

The measuring of the force applied by the annulus gear on the static structure may comprise providing at least one pressure pad, strain gauge, fibre optic cable or compression force cell.

The measuring of the first rotational speed sensor may comprise using a variable-reluctance speed probe and a phonic wheel.

The measuring of the second rotational speed sensor may comprise using a variable-reluctance speed probe and a phonic wheel.

The method may additionally comprise controlling the thrust setting of the geared gas turbine engine from the thrust of the fan determined from the torque applied to the fan and the rotational speed of the fan.

The present disclosure also provides an apparatus for measuring the thrust of a gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft, wherein:

the gearbox comprising a sun gear, a plurality of planet gears, an annulus gear and a planet carrier, the sun gear meshing with the planet gears and the planet gears meshing with the annulus gear, each planet gear being rotatably mounted on the planet carrier, the core shaft being arranged to drive the sun gear and the planet carrier being arranged to drive the fan via a fan shaft, the annulus gear being mounted in a static structure, the static structure being arranged to restrain rotational movement of the annulus gear, the apparatus for measuring the thrust of a gas turbine engine for an aircraft comprising:

at least one force sensor to measure the force applied by the annulus gear on the static structure, a first rotational speed sensor arranged to measure the rotational speed of the core shaft, a second rotational speed sensor arranged to measure the rotational speed of the fan shaft, a processor arranged to receive the measurement of the force applied by the annulus gear on the static structure, the processor being arranged to determine the restoring torque on the annulus gear from the measurement of the force applied by the annulus gear on the static structure, the processor arranged to receive the measurement of the rotational speed of the core shaft, the processor arranged to receive the measurement of the rotational speed of the fan shaft, the processor being arranged to determine the torque applied to the fan by the planet carrier using the rotational speed of the core shaft, the rotational speed of the fan shaft and the restoring torque on the annulus gear, the processor being arranged to determine the thrust of the fan from the torque applied to the fan and the rotational speed of the fan.

The present disclosure also provides an apparatus for measuring the thrust of a gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft, wherein:

the gearbox comprising a sun gear, a plurality of planet gears, an annulus gear and a planet carrier, the sun gear meshing with the planet gears and the planet gears meshing with the annulus gear, each planet gear being rotatably mounted on the planet carrier, the core shaft being arranged to drive the sun gear and the annulus gear being arranged to drive the fan via a fan shaft, the planet carrier gear being mounted in a static structure, the static structure being arranged to restrain rotational movement of the planet carrier, the apparatus for measuring the thrust of a gas turbine engine for an aircraft comprising:

at least one force sensor to measure the force applied by the planet carrier on the static structure, a first rotational speed sensor arranged to measure the rotational speed of the core shaft, a second rotational speed sensor arranged to measure the rotational speed of the fan shaft, a processor arranged to receive the measurement of the force applied by the planet carrier on the static structure, the processor being arranged to determine the restoring torque on the planet carrier from the measurement of the force applied by the planet carrier on the static structure, the processor arranged to receive the measurement of the rotational speed of the core shaft, the processor arranged to receive the measurement of the rotational speed of the fan shaft, the processor being arranged to determine the torque applied to the fan by the annulus gear using the rotational speed of the core shaft, the rotational speed of the fan shaft and the restoring torque on the planet carrier, the processor being arranged to determine the thrust of the fan from the torque applied to the fan and the rotational speed of the fan.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
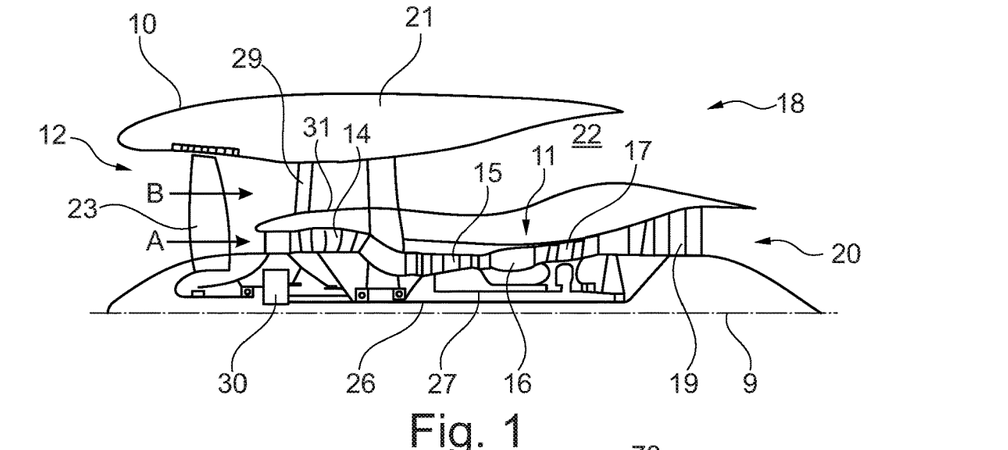
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a core shaft 26 and an epicyclic gearbox 30. In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
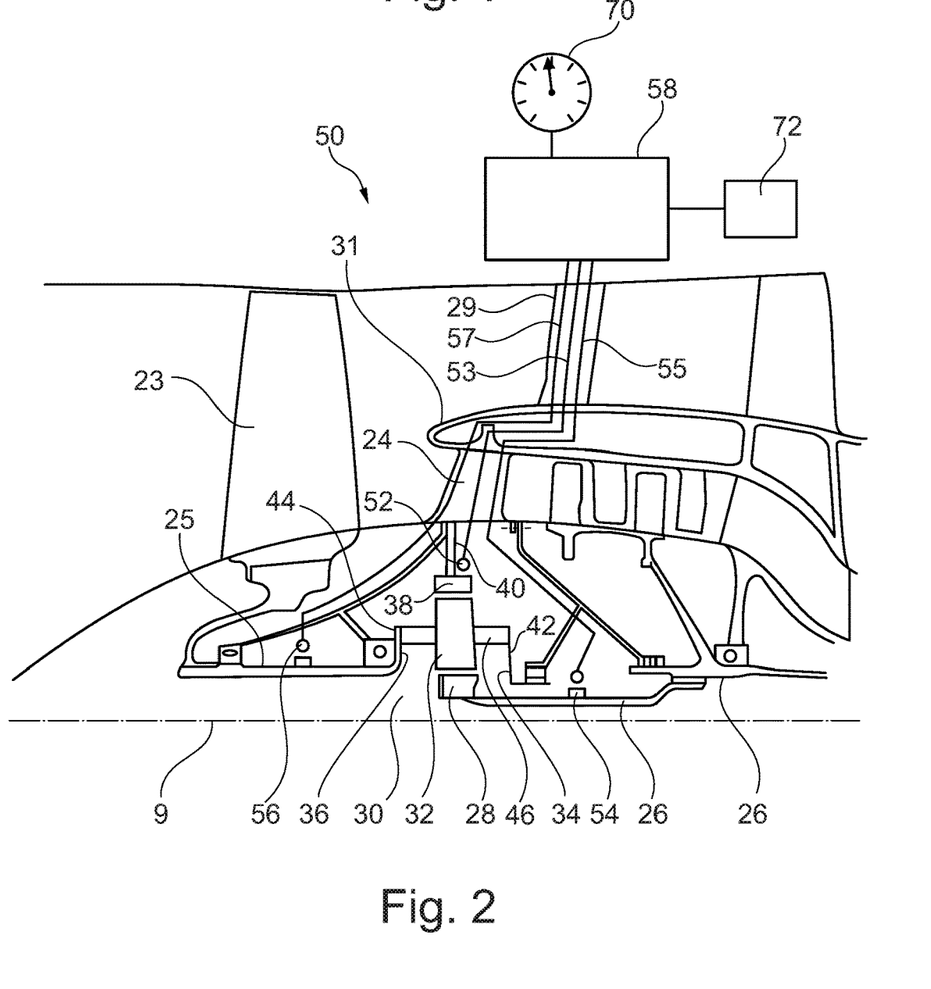
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the core shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus gear, or ring gear, 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting core shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
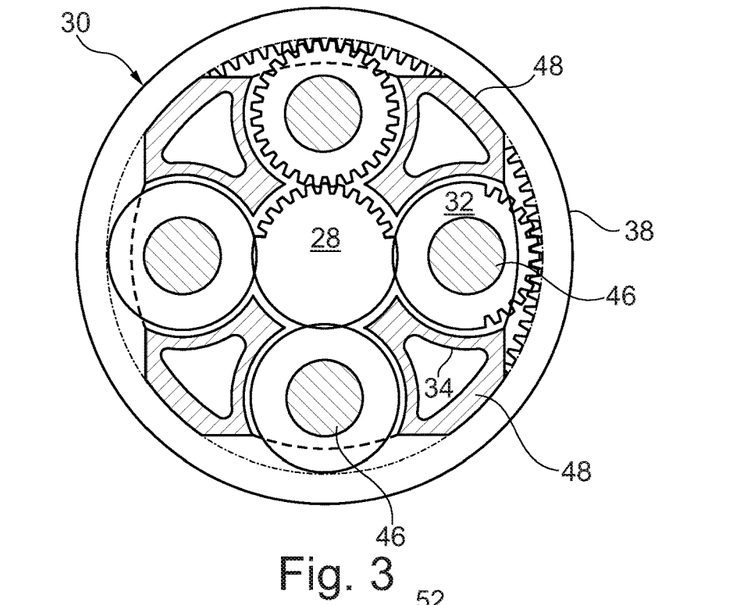
FIG. 3 is a partially cut-away view of a gearbox for a gas turbine engine.

The epicyclic gearbox 30 is shown by way of example in greater detail in FIG. 3. Each of the sun gear 28, planet gears 32 and annulus gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the annulus gear 38 fixed. However, any other suitable type of epicyclic gearbox 30 may be used. By way of further example, the epicyclic gearbox 30 may be a star arrangement, in which the planet carrier 34 is held fixed, with the annulus gear 38 allowed to rotate. In such an arrangement the fan 23 is driven by the annulus gear 38. By way of further alternative example, the gearbox 30 may be a differential gearbox in which the annulus gear 38 and the planet carrier 34 are both allowed to rotate.

It will be appreciated that the arrangement shown in FIGS. 2 and 3 is by way of example only, and various alternatives are within the scope of the present disclosure.

Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, core shaft 26, the output shaft 25 and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2. The planet carrier 34 comprises a first ring 42, a second ring 44 spaced axially from the first ring 42, a plurality of circumferentially spaced axles 46 and a plurality of circumferentially spaced support structures 48 extending axially between and secured to the first ring 42 and the second ring 44. Each planet gear 32 is rotatably mounted on a respective one of the axles 46.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
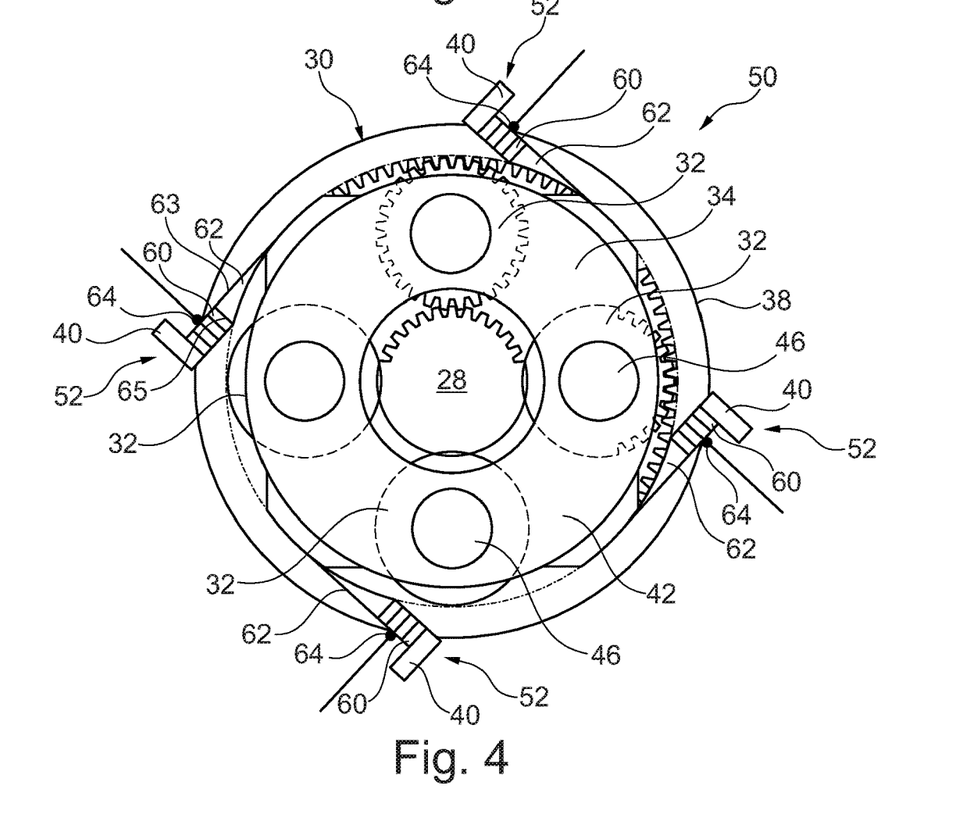
FIG. 4 is an end view of the gearbox shown in FIG. 3.

An apparatus 50 for measuring the thrust of the gas turbine engine 10 is shown in FIGS. 2 and 4. As mentioned previously, in FIG. 2, the planet carrier 34 is arranged to drive the fan 23 via the output shaft, or fan shaft, 25, the annulus gear 38 is mounted in static structure. The static structure comprises the linkages 40 to the stationary supporting structure 24. The static structure 40 is arranged to restrain rotational movement of the annulus gear 38. At least one force sensor 52 is provided to measure the force applied by the annulus gear 38 on the static structure 40. A first rotational speed sensor 54 is arranged to measure the rotational speed of the core shaft, e.g. the input shaft 26, core shaft 26, and a second rotational speed sensor 56 is arranged to measure the rotational speed of the fan shaft 25. A processor 58 is arranged to receive the measurement of the force applied by the annulus gear 38 on the static structure 40. The processor 58 arranged to receive the measurement of the rotational speed of the core shaft 26 and the processor 58 is arranged to receive the measurement of the rotational speed of the fan shaft 25. The processor 58 is arranged to determine the restoring torque on the annulus gear 38 from the measurement of the force applied by the annulus gear 38 on the static structure 40. The processor 58 is arranged to determine the torque applied to the fan 23 by the planet carrier 34 using the rotational speed of the core shaft 26, the rotational speed of the fan shaft 25 and the restoring torque on the annulus gear 38. The processor 58 is arranged to determine the thrust of the fan 23 from the torque applied to the fan 23 and the rotational speed of the fan 23. The at least one force sensor 52 supplies an electrical signal indicative of the force through electric cable 53 to the processor 58. The first rotational speed sensor 54 supplies an electrical signal indicative of the speed through electric cable 55 to the processor 58. The second rotational speed sensor 56 supplies an electrical signal indicative of the speed through electric cable 57 to the processor 58. The electric cables 53, 55 and 57 extend through the fixed structure 24, which comprises compressor inlet guide vanes secured to an engine core casing 31, and one or more vanes 29 extending from the engine core casing 31 to the nacelle 21.

There is a plurality of force sensors 52 circumferentially arranged, angularly spaced, around the annulus gear 38. In this example there are four force sensors 52 angularly spaced apart by 90°. The, or each, force sensor 52 comprises a fluid filled collapsible chamber 60 mounted on the static structure 40, a member 62 mounted on the annulus gear 38 and arranged to bear upon the fluid filled collapsible chamber 60 and a pressure sensor 64 to measure the pressure of the fluid within the fluid filled collapsible chamber 60. The member 62 of the, or each, force sensor 52 extends axially from a first axial side of the annulus gear 38. The member 62 is wedge shaped. The member 62 has a first face 63 arranged tangentially to a circle coaxial with the annulus gear 38 and the member 62 has a second face 65 arranged perpendicularly to the first face 63. A first end of the fluid filled collapsible chamber 60 abuts the second face 65 of the member 62 and a second end, an opposite end, of the fluid filled collapsible chamber 60 abuts the static structure 40. The fluid filled collapsible chamber 60 may comprise a bellows filled with oil. The static structure 40 may comprise a plurality of circumferentially spaced members 41 extending radially inwardly from the static structure 40. In this example the members 41 are arranged perpendicular to a tangent of a circle coaxial with the gearbox 30. However, the members 41 may be arranged parallel to a radius of the gearbox 30 or at any other suitable angle. The members 41 may also extend axially from the static structure 40, for example if the static structure 40 comprises a frusto-conical member supporting the fan shaft 25 via one or more bearings or comprises a frusto-conical member supporting the planet carrier 34 via one or more bearings.

The first rotational speed sensor 54 in this example comprises a variable-reluctance speed probe and a phonic wheel. However, other suitable rotational speed sensors may be used. The second rotational speed sensor 56 comprises a variable-reluctance speed probe and a phonic wheel. However, other suitable rotational speed sensors may be used.

It may be possible to provide a plurality of force sensors 52 circumferentially arranged, angularly spaced, around the annulus gear 38 as described in the previous paragraph but the, or each, member 62 extend axially from a second axial side of the annulus gear 38.

The present disclosure is only applicable to a gas turbine engine, e.g. a turbofan gas turbine engine, 10 that has a gearbox 30 between the fan shaft 25 and the core shaft 26. In the present disclosure the restraining torque applied to a gearbox 30, such as an annulus gear 38 of an epicycle gearbox 30, is used as a thrust setting parameter. The restraining torque (DeltaT) is simply the difference between the gearbox input torque and the gearbox output torque.

If Tin, Nin, Tout and Nout are the gearbox input torque, input speed, gearbox output torque and output speed respectively, then the ratio of the gearbox input torque to the gearbox output torque is given by:

$$Tin/Tout=Nout/Nin \quad (1)$$

The annulus gear/gearbox restraining torque (DeltaT) is given by:

$$DeltaT=Tout-Tin \quad (2)$$

Substituting (2) into (1) and eliminating Tin we get:

$$Tout=DeltaT/(1-Nout/Nin) \quad (3)$$

By substituting Tout into (1) or (2) Tin can be determined. However, it is Tout that we need as this is the fan torque.

During operation of the geared gas turbine engine 10, such as take-off and climb, the annulus gear 38 is stationary by applying a suitable restraining torque to the annulus gear 38.

Therefore from Equation (3), Tout, which is the fan shaft torque, is proportional to the net torque (DeltaT). The measure of the pressure in the fluid filled collapsible chamber, the oil filled bellows, 60 as shown in FIG. 4, is used as a reliable measure of fan torque.

The fan power is simply the product of the fan torque and fan speed (as angular velocity). For a high bypass ratio engine much of the engine thrust is generated by the fan and delivered via the bypass exhaust nozzle 18. The gross thrust (Fcg) of the bypass exhaust nozzle can be estimated by Equation 4.

$$Fcg=(DeltaT\times Nin/(Nin-Nout))^{(2/3)} \quad (4)$$

Engine core deterioration will not affect the thrust vs DeltaT relationship. In fact only fan/bypass duct deterioration would affect this thrust relationship.

More generally, the net thrust from the engine may be mapped against fan power derived from these measurements, and the flight conditions. A particular way of mapping net thrust from the engine against fan power is given by:

$$FN/Pamb=f(Fan\ Power/(P20\times sqrt(T20), Mach)$$

Where FN is the net thrust from the engine (e.g. the net uninstalled thrust from the engine), Pamb is the ambient pressure, P20 and T20 are the engine inlet stagnation pressure and temperature, Mach is the flight Mach number.

The apparatus 50 shown in FIGS. 2 and 4 is used to determine the net torque, e.g. the annulus gear restraining torque. A plurality of fluid filled collapsible chambers 60, e.g. oil filled bellows, are positioned circumferentially around the annulus gear 38 so that the apparatus may operate safely, e.g. if there is failure of one of the fluid filled collapsible chambers 60 the remaining fluid filled collapsible chambers 60 may be used to determine the net torque, the annulus gear restraining torque.

The pressure within the fluid filled collapsible chambers 60, oil filled bellows, is measured and is an indication of net torque of the gearbox 30, which is used in Equation 4 above to determine thrust. Such fluid filled collapsible chambers 60, oil filled bellows, are positioned along the rim of the annulus gear 38 at any desirable angle to the annulus gear 38 so that they restrain the annulus gear 38 from turning.

The failure of a fluid filled collapsible chamber 60, a bellow, does not cause the annulus gear 38 to rotate and should not increase the load on the remaining fluid filled collapsible chambers 60, bellows. This is because the failed fluid filled collapsible chamber 60, bellow, would come to rest on the stop preventing the failed fluid filled collapsible chamber 60, bellows, from moving but would produce no pressure measurement due to the failure of the fluid filled collapsible chamber 60, bellow. There would be a fluid leak, e.g. an oil leak.

The pressure in the fluid filled collapsible chambers 60, bellows, are measured and converted to a force by multiplying the measured pressure by the area of contact of the fluid filled collapsible chambers 60, bellows. Multiplying this force by the radius of the annulus gear 38 gives the restraining toques, which is the net torque applied to the annulus gear 38. With measurements of the fan shaft 25 and core shaft 26 speeds, e.g. the gearbox output speed and the gearbox input speed respectively, and the net torque the fan torque is determined using Equation 3, which can then be used to determine the fan gross thrust using Equation 4.

Thus, the method comprises measuring the force applied by the annulus gear 38 on the static structure 40, 24, measuring the rotational speed of the core shaft 26, measuring the rotational speed of the fan shaft 25, determining the restoring torque on the annulus gear 38 from the measurement of the force applied by the annulus gear 38 on the static structure 24, 40, determining the torque applied to the fan 23 by the planet carrier 34 using the rotational speed of the core shaft 26, the rotational speed of the fan shaft 25 and the restoring torque on the annulus gear 38, and determining the thrust of the fan 23 from the torque applied to the fan 23 and the rotational speed of the fan 23.

Figure 5:
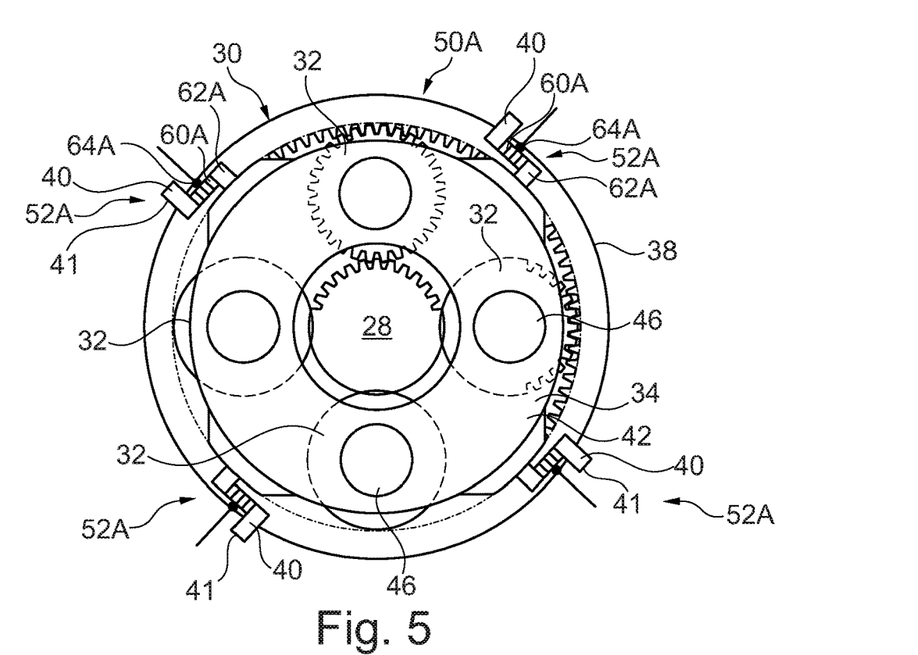
FIG. 5 is an alternative end view of the gearbox shown in FIG. 3.

Another apparatus 50A for measuring the thrust of the gas turbine engine 10 is shown in FIG. 5. The arrangement in FIG. 5 is substantially the same as that described with reference to FIGS. 2 and 4 and like parts are denoted by like numerals. There is a plurality of force sensors 52A circumferentially arranged, angularly spaced, around the annulus gear 38. The member 62A of the, or each, force sensor 52A extends axially from a first axial side of the annulus gear 38, the member 62A has a face arranged parallel to a radial line passing through the annulus gear 38 and the fluid filled collapsible chamber 60A abuts the face of the member 62. In this example the members 41 are arranged parallel to a radius of the gearbox 30. This arrangement works in substantially the same way as that described with reference to FIGS. 2 and 4.

Figure 6:
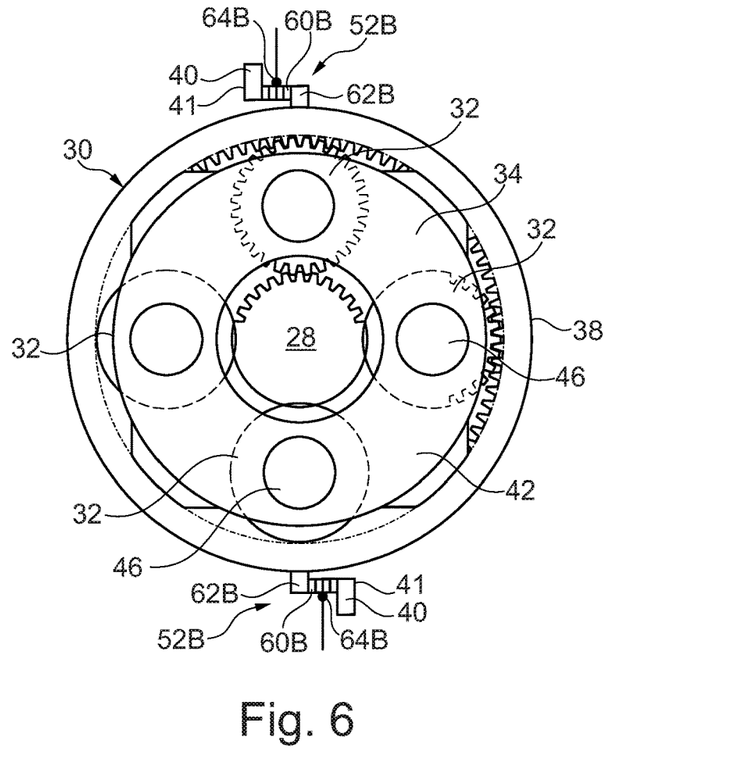
FIG. 6 is a further alternative end view of the gearbox shown in FIG. 3.

A further apparatus 50B for measuring the thrust of the gas turbine engine 10 is shown in FIG. 6. The arrangement in FIG. 6 is substantially the same as that described with reference to FIGS. 2 and 4 and like parts are denoted by like numerals. There is a plurality of force sensors 52B circumferentially arranged, angularly spaced, around the annulus gear 38. The member 62B of the, or each, force sensor 52B extends radially from the rim of the annulus gear 38, the member 62B has a face arranged parallel to a radial line passing through the annulus gear 38 and the fluid filled collapsible chamber 60B abuts the face of the member 62B. This arrangement works in substantially the same way as that described with reference to FIGS. 2 and 4.

Figure 7:
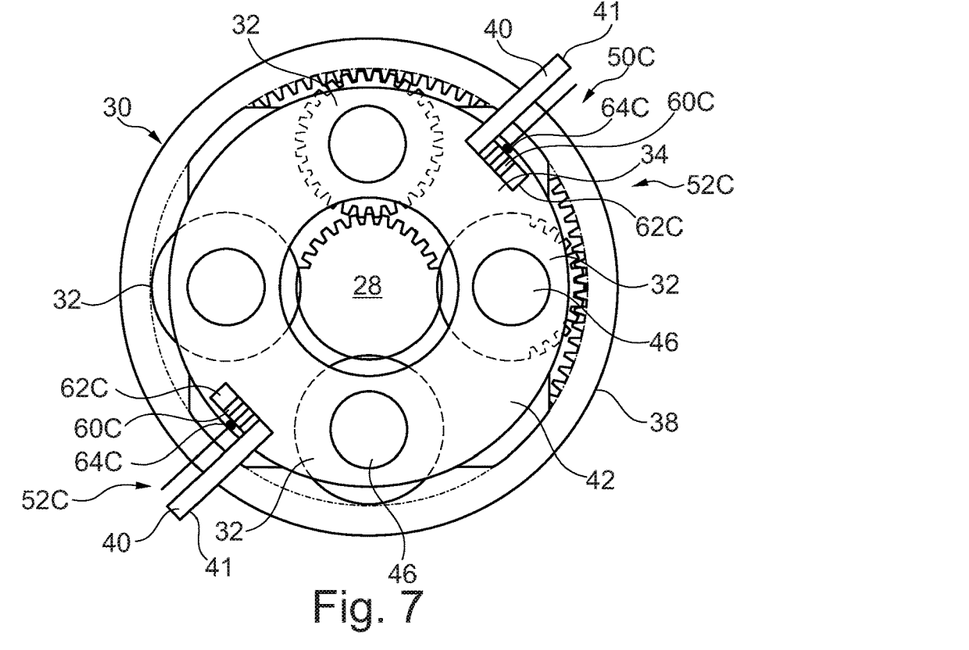
FIG. 7 is another end view of the gearbox shown in FIG. 3.

An additional apparatus 50C for measuring the thrust of the gas turbine engine 10 is shown in FIG. 7. The arrangement in FIG. 7 is substantially the same as that described with reference to FIGS. 2 and 4 and like parts are denoted by like numerals. The arrangement of FIG. 7 differs in that the annulus gear 38 of the gearbox 30 drives the fan shaft 25 and the planet carrier 34 is mounted in static structure. The static structure comprises the linkages 40 to the stationary supporting structure 24. The static structure 40 is arranged to restrain rotational movement of the planet carrier 34. There is a plurality of force sensors 52C circumferentially arranged, angularly spaced, around the planet carrier 34. The, or each, force sensor 52C comprises a fluid filled collapsible chamber 60C mounted on the static structure 40, a member 62C mounted on the planet carrier 34 and arranged to bear upon the fluid filled collapsible chamber 60C and a pressure sensor 64C to measure the pressure of the fluid within the fluid filled collapsible chamber 60C. The member 62C of the, or each, force sensor 52C extends axially from a first axial side of the planet carrier 34, the member 62C has a face arranged parallel to a radial line passing through the planet carrier 34 and the fluid filled collapsible chamber 60C abuts the face of the member 62C. Alternatively the member of the, or each, force sensor may extend axially from a first axial side of the planet carrier, the member being wedge shaped, the member having a first face arranged tangentially to a circle coaxial with the planet carrier, the member having a second face arranged perpendicularly to the first face and the fluid filled collapsible chamber abutting the second face of the member. The, or each, fluid filled collapsible chamber 60 may comprise a bellows filled with oil. The first rotational speed sensor 54 comprises a variable-reluctance speed probe and a phonic wheel. However, other suitable rotational speed sensors may be used. The second rotational speed sensor 56 comprises a variable-reluctance speed probe and a phonic wheel. However, other suitable rotational speed sensors may be used.

Thus in the FIG. 7 arrangement the annulus gear 38 is arranged to drive the fan 23 via the fan shaft 25, the planet carrier 34 is mounted in the static structure 40, 24, the static structure 40, 24 is arranged to restrain rotational movement of the planet carrier 34. The at least one force sensor 52C is arranged to measure the force applied by the planet carrier 34 on the static structure 40, 24. The processor 58 is arranged to receive the measurement of the force applied by the planet carrier 34 on the static structure 40, 24, the processor 58 is arranged to determine the restoring torque on the planet carrier 34 from the measurement of the force applied by the planet carrier 34 on the static structure 40, 24, the processor 58 is arranged to determine the torque applied to the fan 23 by the annulus gear 38 using the rotational speed of the core shaft 26, the rotational speed of the fan shaft 25 and the restoring torque on the planet carrier 34.

The static structure 40 may comprise a plurality of circumferentially spaced members 41 extending radially inwardly from the static structure 40. In this example the members 41 are arranged perpendicular to a tangent of a circle coaxial with the gearbox 30. However, the members 41 may be arranged parallel to a radius of the gearbox 30 or at any other suitable angle. The members 41 may also extend axially from the static structure 40, for example if the static structure 40 comprises a frusto-conical member supporting the fan shaft 25 via one or more bearings or comprises a frusto-conical member supporting the planet carrier 34 via one or more bearings.

Figure 8:
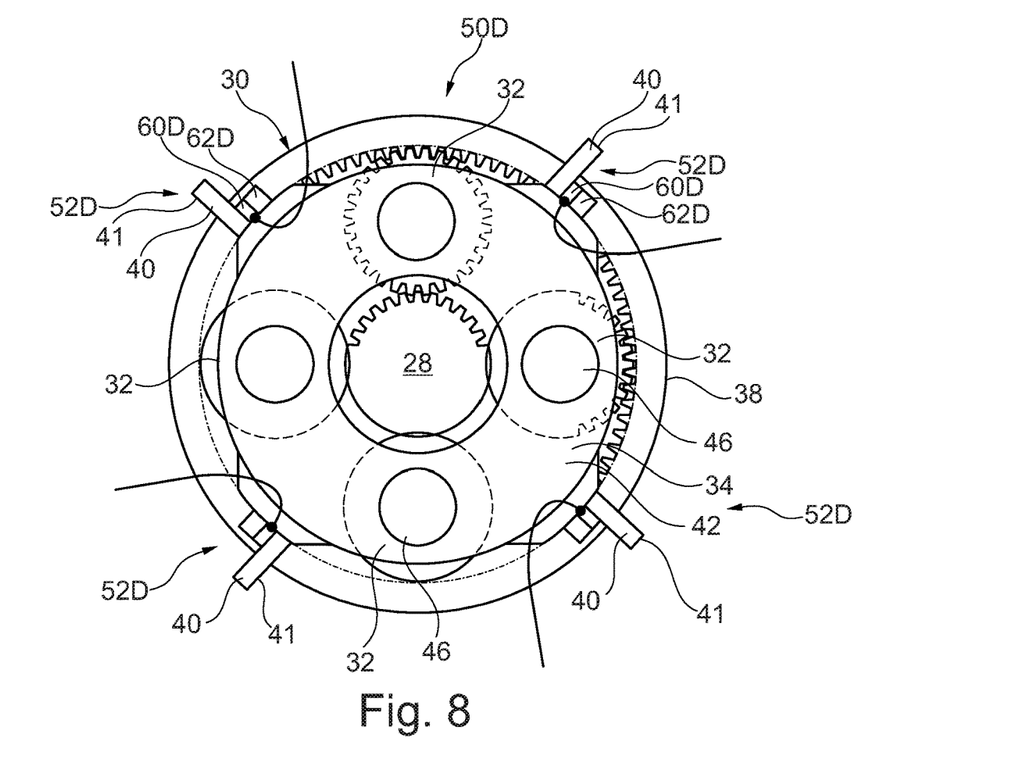
FIG. 8 is an additional end view of the gearbox shown in FIG. 3.

A further apparatus 50D for measuring the thrust of the gas turbine engine 10 is shown in FIG. 8. The arrangement in FIG. 8 is substantially the same as that described with reference to FIG. 5 and like parts are denoted by like numerals. There is a plurality of force sensors 52D circumferentially arranged, angularly spaced, around the annulus gear 38. The member 62D of the, or each, force sensor 52D extends axially from a first axial side of the annulus gear 38, the member 62D has a face arranged parallel to a radial line passing through the annulus gear 38. In this arrangement a pressure pad 60D is used instead of the fluid filled collapsible chamber and the pressure pad 60D abuts the face of the member 62D. This arrangement works in substantially the same way as that described with reference to FIGS. 2 and 4. The, or each, pressure pad converts the force into voltage, which is calibrated to measure force directly.

Thus, the method comprises measuring the force applied by the planet carrier 34 on the static structure 24, 40, measuring the rotational speed of the core shaft 26, measuring the rotational speed of the fan shaft 25, determining the restoring torque on the planet carrier 34 from the measurement of the force applied by the planet carrier 34 on the static structure 24, 40, determining the torque applied to the fan 23 by the annulus gear 38 using the rotational speed of the core shaft 26, the rotational speed of the fan shaft 25 and the restoring torque on the planet carrier 34, and determining the thrust of the fan 23 from the torque applied to the fan 23 and the rotational speed of the fan 23.

Referring back to FIG. 2, the processor 58 may display the measured thrust on a display unit 70. The display unit 70 may be a thrust gauge, a display unit or a monitor. The processor 58 may be arranged to control the thrust setting 72 of the geared gas turbine engine 10 from the thrust of the fan determined from the torque applied to the fan and the rotational speed of the fan. Thus, when the pilot of the aircraft selects a required thrust level for the geared gas turbine engine 10 the thrust of the fan 23 is determined using the method according to the previous paragraph and this is compared to the required thrust and the processor 58 control the thrust setting 72 by increasing the flow of fuel to the geared gas turbine engine 10 if the thrust of the fan 23 determined is less than the required thrust level or by decreasing the flow of fuel to the geared gas turbine engine 10 if the thrust of the fan 23 determined is more than the required thrust level.

The thrust provided by the engine core 11 may also be measured, or determined, and the thrust provided by the engine core 11 measured, or determined, may be used by the processor 58 to control the thrust setting 72 of the geared gas turbine engine 10. The processor 58 may add the thrust provided by the engine core 11 and the thrust provided by the fan 23 together to provide a combined thrust for the geared gas turbine engine 10. The thrust provided by the engine core 11 is thrust provided by the hot gases flowing out of the core exhaust nozzle 20 whereas the thrust provided by the fan 23 is thrust provided by gases flowing out of the bypass exhaust nozzle 18. The thrust provided by the hot gases flowing out of the core exhaust nozzle 20 is a small fraction of the total thrust, and is less than 10% of the total thrust. The thrust provided by the hot gases flowing out of the core exhaust nozzle 20 is proportional to the thrust provided by gases flowing out of the bypass exhaust nozzle 18, e.g. the fan thrust, at a particular flight condition. The total thrust maps well against the fan thrust, or fan power, and flight conditions.

Although the present disclosure has referred to the use of one or more fluid filled collapsible chambers, e.g. oil filled bellows, as force sensors to measure the force it is equally possible to use one or more strain gauges, fibre optic cables or compression force cells as the force sensors.

The sun gear, the planet gears and the annulus gear of the gearbox may each comprise a single set of helical teeth on their periphery or may each comprise two sets of axially spaced helical teeth on their periphery.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An apparatus for measuring the thrust of a gas turbine engine for an aircraft, the gas turbine engine comprising:
   an engine core comprising a turbine, a compressor, and a core shaft connecting the turbine to the compressor;
   a fan located upstream of the engine core, the fan comprising a plurality of fan blades; and
   a gearbox that receives an input from the core shaft and outputs drive to the fan so as to drive the fan at a lower rotational speed than the core shaft, wherein:
   the gearbox comprising a sun gear, a plurality of planet gears, an annulus gear and a planet carrier, the sun gear meshing with the planet gears and the planet gears meshing with the annulus gear, each planet gear being rotatably mounted on the planet carrier, the core shaft being arranged to drive the sun gear and one of the planet carrier and the annulus gear being arranged to drive the fan via a fan shaft,
   the other one of the annulus gear and the planet carrier being mounted in a static structure, the static structure being arranged to restrain rotational movement of the other one of the annulus gear and the planet carrier,
   the apparatus for measuring the thrust of a gas turbine engine for an aircraft comprising:
   at least one force sensor to measure the force applied by the other one of the annulus gear and the planet carrier on the static structure,
   a first rotational speed sensor arranged to measure the rotational speed of the core shaft,
   a second rotational speed sensor arranged to measure the rotational speed of the fan shaft,
   a processor arranged to receive the measurement of the force applied by the other one of the annulus gear and the planet carrier on the static structure, the processor being arranged to determine the restoring torque on the other one of the annulus gear and the planet carrier from the measurement of the force applied by the other one of the annulus gear and the planet carrier on the static structure, the processor arranged to receive the measurement of the rotational speed of the core shaft, the processor arranged to receive the measurement of the rotational speed of the fan shaft, the processor being arranged to determine the torque applied to the fan by the one of the planet carrier and the annulus gear using the rotational speed of the core shaft, the rotational speed of the fan shaft and the restoring torque on the other one of the annulus gear and the planet carrier, the processor being arranged to determine the thrust of the fan from the torque applied to the fan and the rotational speed of the fan.

2. The apparatus of claim 1, wherein the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

3. The apparatus of claim 1, wherein the planet carrier being arranged to drive the fan via the fan shaft,
   the annulus gear being mounted in the static structure, the static structure being arranged to restrain rotational movement of the annulus gear,
   the at least one force sensor to measure the force applied by the annulus gear on the static structure,
   the processor arranged to receive the measurement of the force applied by the annulus gear on the static structure, the processor being arranged to determine the restoring torque on the annulus gear from the measurement of the force applied by the annulus gear on the static structure, the processor being arranged to determine the torque applied to the fan by the planet carrier using the rotational speed of the core shaft, the rotational speed of the fan shaft and the restoring torque on the annulus gear.

4. The apparatus of claim 3, wherein the at least one force sensor comprises a plurality of force sensors circumferentially arranged, angularly spaced, around the annulus gear.

5. The apparatus of claim 3, wherein the, or each, force sensor comprising a fluid filled collapsible chamber mounted on the static structure, a member mounted on the annulus gear and arranged to bear upon the fluid filled collapsible chamber and a pressure sensor to measure the pressure of the fluid within the fluid filled collapsible chamber.

6. The apparatus of claim 5, wherein the member of the, or each, force sensor extends axially from a first axial side of the annulus gear, the member having a face arranged parallel to a radial line passing through the annulus gear and the fluid filled collapsible chamber abutting the face of the member.

7. The apparatus of claim 5, wherein the member of the, or each, force sensor extends axially from a first axial side of the annulus gear, the member being wedge shaped, the member having a first face arranged tangentially to a circle coaxial with the annulus gear, the member having a second face arranged perpendicularly to the first face and the fluid filled collapsible chamber abutting the second face of the member.

8. The apparatus of claim 1, wherein the annulus gear being arranged to drive the fan via the fan shaft,
   the planet carrier being mounted in the static structure, the static structure being arranged to restrain rotational movement of the planet carrier,
   the at least one force sensor to measure the force applied by the planet carrier on the static structure,
   a processor arranged to receive the measurement of the force applied by the planet carrier on the static structure, the processor being arranged to determine the restoring torque on the planet carrier from the measurement of the force applied by the planet carrier on the static structure, the processor being arranged to determine the torque applied to the fan by the annulus gear using the rotational speed of the core shaft, the rotational speed of the fan shaft and the restoring torque on the planet carrier.

9. The apparatus of claim 8, wherein the at least one force sensor comprises a plurality of force sensors circumferentially arranged, angularly spaced, around the planet carrier.

10. The apparatus of claim 8, wherein the, or each, force sensor comprising a fluid filled collapsible chamber mounted on the static structure, a member mounted on the planet carrier and arranged to bear upon the fluid filled collapsible chamber and a pressure sensor to measure the pressure of the fluid within the fluid filled collapsible chamber.

11. The apparatus of claim 10, wherein the member of the, or each, force sensor extends axially from a first axial side of the planet carrier, the member having a face arranged parallel to a radial line passing through the planet carrier and the fluid filled collapsible chamber abutting the face of the member.

12. The apparatus of claim 10, wherein the member of the, or each, force sensor extends axially from a first axial side of the planet carrier, the member being wedge shaped, the member having a first face arranged tangentially to a circle coaxial with the planet carrier, the member having a second face arranged perpendicularly to the first face and the fluid filled collapsible chamber abutting the second face of the member.

13. A method of measuring the thrust of a gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the gearbox comprising a sun gear, a plurality of planet gears, an annulus gear and a planet carrier, the sun gear meshing with the planet gears and the planet gears meshing with the annulus gear, each planet gear being rotatably mounted on the planet carrier, the core shaft being arranged to drive the sun gear and one of the planet carrier and the annulus gear being arranged to drive the fan via a fan shaft,
the other one of the annulus gear and the planet carrier being mounted in a static structure, the static structure being arranged to restrain rotational movement of the other one of the annulus gear and the planet carrier,
the method comprising:
measuring the force applied by the other one of the annulus gear and the planet carrier on the static structure,
measuring the rotational speed of the core shaft,
measuring the rotational speed of the fan shaft,
determining the restoring torque on the other one of the annulus gear and the planet carrier from the measurement of the force applied by the other one of the annulus gear and the planet carrier on the static structure, determining the torque applied to the fan by the one of the planet carrier and the annulus gear using the rotational speed of the core shaft, the rotational speed of the fan shaft and the restoring torque on the other one of the annulus gear and the planet carrier,
and determining the thrust of the fan from the torque applied to the fan and the rotational speed of the fan.

14. The method of claim 13, wherein the annulus gear being arranged to drive the fan via the fan shaft,
the planet carrier being mounted in the static structure, the static structure being arranged to restrain rotational movement of the planet carrier,
the method comprising measuring the force applied by the planet carrier on the static structure,
determining the restoring torque on the planet carrier from the measurement of the force applied by the planet carrier on the static structure, determining the torque applied to the fan by the annulus gear using the rotational speed of the core shaft, the rotational speed of the fan shaft and the restoring torque on the planet carrier.

15. The method of claim 13, wherein the measuring of the force applied by the annulus gear on the static structure comprises providing at least one pressure pad, strain gauge, fibre optic cable or compression force cell.

16. The method of claim 13, wherein the measuring of the first rotational speed sensor comprises using a variable-reluctance speed probe and a phonic wheel.

17. The method of claim 13, wherein the measuring of the second rotational speed sensor comprises using a variable-reluctance speed probe and a phonic wheel.

18. The method of claim 13, wherein the method further comprises controlling the thrust setting of the geared gas turbine engine from the thrust of the fan determined from the torque applied to the fan and the rotational speed of the fan.

19. The method of claim 13, wherein the planet carrier being arranged to drive the fan via the fan shaft,
the annulus gear being mounted in the static structure, the static structure being arranged to restrain rotational movement of the annulus gear,
the method comprising measuring the force applied by the annulus gear on the static structure,
determining the restoring torque on the annulus gear from the measurement of the force applied by the annulus gear on the static structure, determining the torque applied to the fan by the planet carrier using the rotational speed of the core shaft, the rotational speed of the fan shaft and the restoring torque on the annulus gear.

20. The method of claim 19, wherein the measuring of the force applied by the annulus gear on the static structure comprises providing a plurality of force sensors circumferentially arranged, angularly spaced, around the annulus gear, the measuring of the force applied by the annulus gear on the static structure comprises providing a fluid filled collapsible chamber mounted on the static structure, providing a member mounted on the annulus gear and arranged to bear upon the fluid filled collapsible chamber and measuring the pressure of the fluid within the fluid filled collapsible chamber.

* * * * *